United States Patent [19]

Annemaier et al.

[11] Patent Number: 4,816,312
[45] Date of Patent: Mar. 28, 1989

[54] FIRE PREVENTION MATERIAL

[75] Inventors: Dieter Annemaier, Oberkirchberg; Robert Graf, Altenstadt; Stefan Keipl, Bellenberg, all of Fed. Rep. of Germany

[73] Assignee: Chemische Fabrik Grunau GmbH, Fed. Rep. of Germany

[21] Appl. No.: 918,348

[22] Filed: Oct. 14, 1986

[30] Foreign Application Priority Data

Oct. 15, 1985 [DE] Fed. Rep. of Germany ....... 3536625

[51] Int. Cl.$^4$ .............................................. B32B 1/06
[52] U.S. Cl. ......................................... 428/74; 428/71; 428/76; 428/920; 428/921; 523/179; 252/606
[58] Field of Search ................. 428/68, 70, 74, 76, 428/71, 921, 920, 402; 252/606; 523/179; 521/907

[56] References Cited

U.S. PATENT DOCUMENTS

| | | | |
|---|---|---|---|
| 4,009,137 | 2/1977 | Dany et al. | 523/179 |
| 4,225,649 | 9/1980 | Peterson | 428/383 |
| 4,247,435 | 1/1981 | Kasten | 252/606 X |
| 4,273,879 | 6/1981 | Langer et al. | 521/91 |
| 4,278,207 | 7/1981 | Morel | 241/4 |
| 4,473,608 | 9/1984 | Grundmann | 428/74 |

FOREIGN PATENT DOCUMENTS

| | | |
|---|---|---|
| 2844693 | 11/1978 | Fed. Rep. of Germany . |
| 2820873 | 4/1979 | Fed. Rep. of Germany . |
| 2831616 | 1/1980 | Fed. Rep. of Germany . |
| 3212672 | 11/1982 | Fed. Rep. of Germany . |

*Primary Examiner*—Alexander S. Thomas
*Attorney, Agent, or Firm*—Steele, Gould & Fried

[57] ABSTRACT

The invention relates to a fire prevention material in loose form containing at least one material thermally insulating at temperatures up to 1100° C.; at least one material which irreversibly expands at temperatures over 150° C., particularly over 200° C.; and at least one preferably finely divided binder, which is able to expand on heating. All the constituents of the material are waterproof and weatherproof, so that the fire prevention material can be frequently handled over long periods. It is preferably packed into incompletely filled bags.

23 Claims, No Drawings

FIRE PREVENTION MATERIAL

The present invention relates to a fire prevention material in loose form, particularly in a flexible, not completely filled pack.

The building authorities require minimum fire resistance periods for numerous components, such as walls, ceilings and light partitions. If these components contain openings or break-throughs for installation purposes, e.g. for the passage of cables, pipes and ventilation lines, then there is a risk of passing on the fire therethrough into the next construction sections and buildings. Thus, previously such openings and break-throughs were sealed by mortar at the end of the installation work, which led to considerable problems on drawing through new cables, pipes and lines. This problem was not encountered with "asbestos bags" in form of small sacks or bags made from asbestos fabric with loose asbestos fibre fillings. These bags have been increasingly less frequently used over the last few years, because it has been recognized that asbestos fibres are prejudicial to health.

In addition, polyethylene bags with mineral fibre filling are known. The envelope is flammable and can pass the fire through the opening. If the polyethylene envelope is destroyed by the fire or parts falling down during the fire, then there is a risk of the opening becoming leaky due to the outflow or dropping of the mineral fibres which are no longer held together. Much the same applies with canvas bags with a mineral fibre filling.

Jute bags or sacks filled with mineral fibres and coated with a fire preventive coating made from insulating layer-forming material are tight. Despite the envelope material being flammable, the fire is not passed on because in the fire the insulating layer-forming material forms an insulating foam. However, as the insulating layer-forming fire prevention coatings are not water tight and are therefore destroyed by water within 10 to 48 hours, said coated bags fail in wet areas, particularly on building sites permanently subject to the action of rain water and water of other types due to cleaning, mortaring and plastering work.

The problem of the invention is to use physiologically unobjectionable fire prevention materials satisfying the requirements of building fire prevention and which also withstand the severe practical conditions.

The fire prevention material according to the invention is characterized in that it contains at least one material which is thermally insulating at temperatures up to 1100° C. at, least one material which irreversibly expands at temperatures over 150° C. and particularly over 200° C. and at least one preferably finely divided binder; and has an expansion capacity on heating from ambient temperature to 1100° C. of at least 5% by volume; and preferably all the constituents, at least in the unheated state, are waterproof and weatherproof.

The fire prevention material according to the invention, which is preferably completely asbestos-free, can be loosely poured into cavities, but is preferably packed in flexible, particularly pad or cushion-like envelopes, so that it is easier to handle. In addition, the pads can be superimposed in building block-like manner, in much the same way as sand bags when building dikes or dams, so that it is also possible to close larger openings. The fire prevention material expands under the action of heat and thereby seals an opening closed by it, so that not only is the fire front stopped, but it is also possible to prevent harmful gases penetrating the fire prevention layer. The advantage of the invention is in particular that the fire prevention material is not modified by the long-lasting action of water and weather and in particular its fire prevention effects are not impaired. The thermally insulating material is heat-resistant up to temperatures of at least 700° C. and particularly up to 1100° and has thermally insulating characteristics. These preferably already exist at normal temperature, but according to one embodiment may only develop under the action of heat. The material expanding under heat action swells or expands, preferably in the temperature range 200° to 1000° C. Thus, the aforementioned sealing action occurs at an early time, so that a good protection of heat-sensitive materials surrounded by the fire prevention material is obtained.

The thermally active binder develops bonding characteristics at temperatures above 100° C. This ensures that the fire prevention material remains movable for handling purposes. However, in the case of a fire, i.e. under the action of heat it no longer flows.

Particularly if the envelope is porous, the fire prevention material advantageously also contains a dust-inhibiting agent. This can have electrostatic binding characteristics, but is more easily liquid and/or tacky. Even small dust-inhibiting agent quantities of 0.5 to 5% by weight, particularly 1 to 3% by weight are adequate to ensure dust-free handling of the fire prevention material. Suitable dust-inhibiting agents are e.g. mineral and/or silicone oil.

The envelope is appropriately at least fammable only with difficulty and is preferably inflammable. It can comprise an organic fibrous material in the form of a knitted, woven or non-woven fabric, preference being given to a woven fabric. Glass fibres are suitable for this purpose, but it is also possible to use more thermally stable fibres, such as mineral fibres, e.g. basalt fibres, or ceramic fibres. It is fundamentally also possible to use fibres from flammable material, such as jute. It is then necessary to provide or impregnate the envelope with a fire prevention coating, this also being preferred for dustproofing purposes. Mixtures for waterproof fire prevention coatings are known.

The binders used preferably melt at temperatures above 100° C. or decompose accompanied by the formation of a tacky substance. Suitable as such a material are in particular thermoplastic materials such polyamide (PA), low density polyethylene (LDPE), high density polyethylene (HDPE), ethylene vinyl acetate (EVAC), polypropylene (PP), polystyrene (PS), polycarbonate (PC) and polyoxymethylene (POM). At temperatures above 600° C., hardening takes place due to the decomposition of the binder and/or sintering of part of the thermally insulating material. Even small binder quantities of generally 0.1 to 6% by weight, preferably 0.5 to 3.5% by weight are sufficient.

The thermally insulating material and/or the material expanding under heat action are contained in the fire prevention material in quantities of preferably more 90% by weight, more particularly more than 95% by weight. The two materials can be identical, i.e. the thermally insulating material can also have an irreversible expansion capacity. However, preferably different materials are provided, in order to permit a favourable matching. In addition, the fire prevention material advantageously contains at least 80 and in particular at least 95% by weight of inflammable materials.

The expansion capacity of the fire prevention material according to the invention is very important, because as a result there is automatically a solidification of the filling of the break-throughs or openings. As a result the bags are e.g. wedged into a wall opening, so that they do not drop out as a result of vibrations or falling objects. As a result of the expansion behaviour, additional leaks in the opening, caused by burning off, melting or other volume contractions or objects passing through the opening (cables or pipes) are sealed. Advantageously the degree of filling of the bags or sacks is a function of the expansion capacity of the fire prevention mixture, so that a bursting of the bags due to expansion is avoided. Since as a result of the marked thermal insulation of the fire prevention material, the bags are not generally heated with their entire content up to higher temperatures, this only applying in fact to the outer layers directly exposed to the fire or heat, the unused volume of the bags or sacks can be kept smaller when filling the fire prevention material than the maximum expansiveness of said material. The fire prevention material can have a composition which is matched in such a way that it has an expansion capacity of up to 600% by volume. For normal uses, an expansion capacity of only 10 to 80% by volume is necessary. The quantity of the material expanding under heat action is a function of this. As a function of its expansiveness, it is preferably contained in quantities of 1 to 50 and preferably 3 to 25% by weight in the material. Preference is given to expanding materials with an inorganic base, particularly a mineral base, such as non-swollen vermiculite and/or perlite.

In special constructional forms the material expanding under heat action can also be of an organic nature and can decompose accompanied by swelling and solidification, whereby it can then also evolve binder characteristics, so that there is no need for an additional binder. As an organic material of this type which expands udner heat action are suitable certain thermosetting resins, such as urea—formaldehyde resins or malamine—formaldehyde resins, as well melamine phosphoric acid compounds, such as monomelamine phosphate, optionally mixed with one another.

With particular advantage inorganic and organic swelling agents are used in mixture, thereby making use of the expansion of the organic substances occurring in the range 200° to 500° C. and the expansion of the inorganic additives observed at 500° to 1000° C.

If organic materials are used as the thermal expansion agent, then their weight proportion is appropriately so low that the fire prevention material is consequently still not flammable. However, it is fundamentally advantageous to use a certain organic material content, which carbonizes or cokes under heat action. Generally the organic constituent content is 5 to 20 and preferably 1 to 10% by weight.

The thermally insulating material, which is normally present in a proportion of more than 80% by weight in the fire prevention material, is preferably of an inorganic nature. It is generally present in pulverized, granular and/or fibrous form. Mineral substances, such as Kieselguhr, expanded clay, pumice, chalk, swollen perlite or swollen vermiculite and inorganic fibres, which preferably have a fibre length of 1 to 15 mm are suitable. However, they can be longer if they are wound and consequently do not impair the mobility or flow characteristics of the loose fire prevention material. According to a preferred embodiment the thermally insulating material comprises fibres, which are shaped into a deformable lumpy to ball-like structure, the lumps having a partical size of approximately 1 to 17 mm. The lumps or balls are at least partly elastic. so that they have resilient characteristics. This leads to the formation of large cavities, which are not lost even when the fire prevention material or the bags filled with it are handled many times. This means that the material retains its low bulk density of less than 500 g/l preferably less than 400 g/l, even after a long period. These loose balls can also incorporate the binder and at least part of the material expanding under heat action, so that separation of the constituents during handling and transferring is avoided. The fibres can be reciprocally fixed in the balls, which can e.g. be brought about by the dedusting agent. The individual constituents of the fire prevention material and also the envelope are preferably free from halogen.

Further features of the invention can be gathered from the following description of preferred exemplified embodiments in conjunction with the subclaims. The individual features can be realised individually or in the form of combinations in the different embodiments.

EXAMPLE 1

A tubular bag made from fibre glass fabric with a width of 20 cm and a length of 35 cm impregnated with a conventional fire prevention coating is filled with a mixture of 30% by weight glass fibres (fibre length 1.0 to 10 mm), 55% by weight of ceramic fibres (fibre length 1.0 to 6.0 mm), 10% by weight of perlite, 3% by weight of formaldehyde urea resin, 1% by weight of low density polyethylene (LDPE) powder and 1% by weight mineral oil to the extent that it is still readily manually shapable and several filled bags are stacked flat upon one another without any risk of falling over.

The fibres used are in the form of flat oval to spherical voluminous balls having a diameter of 1 to 15 mm, mainly 2 to 6 mm. The binder, dust-inhibiting agent, part of the perlite and the formaldehyde—urea resin are bonded into these balls. For producing the filling, the solid constituents are firstly dry premixed, followed by the injection of the mineral oil, whilst continuing the mixing process, so that the balls are formed and their stability is maintained.

In the case of one-sided heating of the bag to over 100° C., the low density polyethylene (LDPE) serving as the binder firstly softens. At the heated points at temperatures just over 200° C., there is a local expansion of the bag content, which leads to a tight closure of the opening. As the temperature rises further, the molten, fibre-bonded LDPE decomposes. If the glass fabric then melts under the powerful heat action, then the fire prevention material behind it has already undergone such a surface hardening that any outflow of the bag content is prevented. In the case of even more marked heat action to above 600° C., the fibres start to sinter, linked with skin formation and crust formation of the surface parts, which are directly exposed to the flames or heat rays, without the insulation action of the deeper material being impaired. Thus, the heat can only slowly penetrate the fire prevention material, so that the wall openings can withstand a fire or objects protected by the fire prevention material are not harmed.

EXAMPLE 2

A tubular bag made from fibre glass fabric in accordance with example 1 is filled with a mxiture of 82% by weight mineral fibres (fibre length 1.0 to 8.0 mm), 5% by weight vermiculite, 10% by weight perlite, 2% by weight EBAC powder and 1% by weight silicone oil in the manner described hereinbefore.

The mineral fibres are again present in the form of flat oval to spherical, voluminous balls having a size of 1 to 17 mm, mainly 2 to 7 mm. Binders, dust-inhibiting agents and part of the vermiculite and perlite are once again bound into the balls. What was stated in connection with example 1 applies regarding the preparation of the mixture. On one-sided heating of the bag to over 100° C., the ethylene vinyl acetate serving as the binder firstly softens. At temperatures over 200° C. the bag content starts to expand. As the temperature rises further, the molten mineral fibre-bonded ethylene vinyl acetate decomposes. The expanding action of the perlite then starts at approximately 500° C. The mineral fibres start to solidify at temperatures of more than 600° C., so that an outflow of the bag content due to the melting of the fibre glass fabric under very marked heat action is avoided.

EXAMPLE 3

A tubular bag made from fibre glass fabric according to example 1 is filled with a mixture of 45% by weight glass fibres (fibre length 1.0 to 10.0 mm), 15% by weight of expanded vermiculite, 31% by weight of ceramic fibres (fibre length 1.0 to 6.0 mm), 5% by weight of vermiculite, 1% by weight of formaldehyde—urea resin, 2% by weight of polyamide powder and 1% by weight of mineral oil in the manner described hereinbefore. The fibres are present in the form of flat oval to spherical, voluminous balls, which have a size of 1.15 mm, mainly 2.6 mm. The binder, dust-inhibiting agent and part of the expanding substances are bound into these balls. The mixture is prepared in the manner described hereinbefore.

On heating the bag to over 100° C., the polyamide serving as the binder firstly softens. At temperatures above 200° C., the bag content locally expands at the heated point. Since at temperatures above 600° C., the glass fibres start to sinter, there is a hardening of the complete bag content, which avoids an outflow of the mixture in the case of very marked heat action on the glass fabric and the resulting melting.

What is claimed is:

1. A waterproof and weatherproof fire prevention heat insulating material in loose form, comprising:
   (a) at least one material thermally insulating at temperatures up to 1100° C.,
   (b) at least one material irreversibly expanding at temperatures over 150° C., wherein the at least one thermally insulating material and the at least one irreversibly expanding material together comprise more than 90% of the fire prevention heat insulating material, by weight,
   (c) at least one binder which is thermally active at 100° to 300° C. and makes up 0.1 to 6% by weight of said fire prevention heat insulation material and is present in at least one of a powder and granular form, and having an expansion capacity on heating from ambient temperature to 1100° C. of at least 5 percent by volume and all constituents of the fire prevention heat insulating material being waterproof and weatherproof, at least in an unheated state, and further comprising a flexible, envelope enclosing the fire prevention heat insulating material.

2. A fire prevention material according to claim 1, further comprising at least one dust-inhibiting agent chosen from the group of liquid and tacky dust-inhibiting agents.

3. A fire prevention material according to claim 1, wherein the envelope ranges from flammable only with difficulty to inflammable, and is made from fibrous material.

4. A fire prevention material according to claims 1 or 3, wherein the envelope is dust tight and further comprising a coating, that is watertight and at most flammable only with difficulty, on the envelope.

5. A fire prevention material according to claim 3, wherein the binder is thermally active at least at temperatures below one of a softening and decomposition range of the envelope and bonds other components of said fire prevention heat insulating material.

6. A fire prevention material according to claim 3, wherein the envelope is a non-woven fabric.

7. A fire prevention material according to claim 1, wherein at least one constituent of the fire prevention material solidifies, accompanied by decomposition following heat action, at least at temperatures above 600° C. and after first becoming tacky, such that after said heat action the fire prevention material solidifies to a porous, rigid block.

8. A fire prevention material according to claim 1, wherein the fire prevention material has an expansion capacity of 5 to 600% by volume on heating to temperatures in a range 200° to 1100° C.

9. A fire prevention material according to claim 1, wherein the material irreversibly expanding under heat action is present in quantities of 1 to 50 percent by weight.

10. A fire prevention material according to claim one, wherein the material irreversibly expanding under heat action comprises at least one of inorganic, inflammable compounds and materials and mixtures thereof.

11. A fire prevention material according to claims 1 or 10, wherein the material irreversibly expanding under heat action comprises organic, waterproof compounds swelling under an elevated temperature and which decompose accompanied by formation of one of a carbon structure and foam.

12. A fire prevention material according to claim 11, wherein the material comprises a member selected from the group consisting of urea-formaldehyde resins, melamine-formaldehyde resins and melamine phosphoric acid in water-insoluble form and a composition brought into a water-insoluble form.

13. A fire prevention material according to claim 1, comprising mixtures of inorganic and organic materials expanding under heat action.

14. A fire prevention material according to claim 1, comprising as the thermally insulating material at least one inflammable material of pulverized, granular and fibrous materials.

15. A fire prevention material according to claim 14, wherein the fibrous materials comprise at least one type of mineral fibers of the group slag fibers, glass fibers and ceramic fibers.

16. A fire prevention material according to claim 14, wherein the thermally insulating material has a deformable lumpy to ball structure.

17. A fire prevention material according to claim 16, wherein the fibers are formed into one of balls and lumps.

18. A fire prevention material according to claim 17, wherein the balls and lumps made from the thermally insulating material have a size of 1 to 17 mm.

19. A fire prevention material according to claim 1, wherein the binder is meltable plastic decomposing at temperature over 200° C.

20. A waterproof and weatherproof fire prevention heat insulating material in loose form, comprising:
   (a) at least one material thermally insulating at temperatures up to 1100° C.,
   (b) at least one material irreversibly expanding at temperatures over 150° C., wherein the at least one thermally insulating material and the at least one irreversibly expanding material together comprise more than 90% of the fire prevention heat insulating material, by weight,
   (c) at least one binder which is thermally active at 100° to 300° C. and makes up 0.1 to 6% by weight of said fire prevention heat insulating material and is present in at least one of a powder and granular form, and having an expansion capacity on heating from ambient temperature to 1100° C. of at least 5 percent by volume and all constituents of the fire prevention heat insulating material being waterproof and weatherproof, at least in an unheated state,
   the material comprising as the thermally insulating material at least one inflammable material of pulverized, granular and fibrous materials, wherein the thermally insulating material has a deformable lumpy to ball structure.

21. A fire prevention material according to claim 20, wherein the fibers are formed into one of balls and lumps.

22. A fire prevention material according to claim 21, wherein the balls and lumps made from the thermally insulating material have a size of 1 to 17 mm.

23. A waterproof and weatherproof fire prevention heat insulating material in loose form, comprising:
   (a) at least one material thermally insulating at temperatures up to 1100° C.,
   (b) at least one material irreversibly expanding at temperatures over 150° C., wherein the at least one thermally insulating material and the at least one irreversibly expanding material together comprise more than 90% of the fire prevention heat insulating material, by weight,
   (c) at least one binder which is thermally active at 100° to 300° C. and makes up 0.1 to 6% by weight of said fire prevention heat insulating material and is present in at least one of a powder and granular form, and having an expansion capacity on heating from ambient temperature to 1100° C. of at least 5% by volume and all constituents of the fire prevention heat insulating material being waterproof and weatherproof, at least in an unheated state, and,
   further comprising a flexible, pad envelope enclosing the fire prevention heat insulating material, the envelope ranging from flamable only with difficulty to inflammable, and being made from fibrous material, the envelope being a non-woven fabric.

* * * * *